US009380039B2

(12) United States Patent
Wildermuth et al.

(10) Patent No.: US 9,380,039 B2
(45) Date of Patent: Jun. 28, 2016

(54) SYSTEMS AND METHODS FOR AUTOMATICALLY LOGGING INTO A USER ACCOUNT

(71) Applicant: GOOGLE INC., Mountain View, CA (US)

(72) Inventors: Sebastian Schnorf Wildermuth, Zurich (CH); Adam Wos, Munich (DE); Dominic Pascal Battre, Munich (DE); Stephan Micklitz, Sauerlach (DE); Felipe Andres Lora Plata, Munich (DE); Tom Heimann, Berlin (DE); Johan Ulrich Lewin Jessen, Munich (DE)

(73) Assignee: GOOGLE INC., Mountain View, CA (US)

( * ) Notice: Subject to any disclaimer, the term of this patent is extended or adjusted under 35 U.S.C. 154(b) by 47 days.

(21) Appl. No.: 13/843,256

(22) Filed: Mar. 15, 2013

(65) Prior Publication Data

US 2014/0282963 A1    Sep. 18, 2014

(51) Int. Cl.

| G06F 7/04 | (2006.01) |
| H04L 29/06 | (2006.01) |
| H04W 4/02 | (2009.01) |
| H04W 12/06 | (2009.01) |
| G06F 21/31 | (2013.01) |
| G06F 15/16 | (2006.01) |

(52) U.S. Cl.
CPC ............ *H04L 63/08* (2013.01); *G06F 21/31* (2013.01); *H04W 4/02* (2013.01); *H04W 12/06* (2013.01); *G06F 2221/2111* (2013.01); *H04L 63/0815* (2013.01)

(58) Field of Classification Search
CPC ... H04L 67/306; H04L 63/08; H04L 63/0815; G06F 21/31; G06F 2221/2111; H04W 12/06; H04W 4/02
USPC ............................................................. 726/7
See application file for complete search history.

(56) References Cited

U.S. PATENT DOCUMENTS 6,748,195 B1 * 6/2004 Phillips ............. H04M 1/72569
                                                        370/338
7,574,202 B1 * 8/2009 Tsao et al. ................... 455/411
8,311,513 B1   11/2012 Nasserbakht et al.
(Continued)

FOREIGN PATENT DOCUMENTS

EP    2293604 A1    3/2011
WO    2012064651 A2    5/2012

OTHER PUBLICATIONS

International Search Report and Written Opinion for PCT/US2014/029171, Aug. 14, 2014, 11 pgs.
(Continued)

*Primary Examiner* — Evans Desrosiers
*Assistant Examiner* — Gary Gracia
(74) *Attorney, Agent, or Firm* — Procopio, Cory, Hargreaves & Savitch LLP

(57) ABSTRACT

Systems and methods for automatically logging into a user account are described, including receiving, using a device, data from an external source or from two or more sources comprising an internal source and another source, wherein the external source is not a user; determining, using the device, that at least a portion of received data is new data; and based on the received data, automatically logging in, from the device, to an account of the user.

17 Claims, 6 Drawing Sheets

(56) References Cited

U.S. PATENT DOCUMENTS

| | | | |
|---|---|---|---|
| 8,478,306 B2 | 7/2013 | Zheng | |
| 8,588,749 B1* | 11/2013 | Sadhvani | H04M 1/24 379/1.01 |
| 9,125,144 B1* | 9/2015 | Orbach | H04M 19/04 |
| 2005/0285739 A1* | 12/2005 | Velhal | G08B 21/0227 340/572.1 |
| 2007/0253578 A1* | 11/2007 | Verdecanna | H03G 3/10 381/104 |
| 2008/0082465 A1* | 4/2008 | Meijer | G06Q 10/00 706/12 |
| 2008/0153512 A1* | 6/2008 | Kale et al. | 455/456.3 |
| 2009/0061902 A1* | 3/2009 | Abhyanker | H04L 12/18 455/456.3 |
| 2009/0111462 A1* | 4/2009 | Krinsky et al. | 455/423 |
| 2009/0170532 A1* | 7/2009 | Lee et al. | 455/456.3 |
| 2009/0181651 A1* | 7/2009 | Klassen | H04M 1/72547 455/414.1 |
| 2010/0077484 A1* | 3/2010 | Paretti et al. | 726/26 |
| 2010/0114803 A1* | 5/2010 | Moon et al. | 706/12 |
| 2010/0185640 A1* | 7/2010 | Dettinger et al. | 707/758 |
| 2010/0199335 A1* | 8/2010 | Ooki | 726/6 |
| 2010/0203901 A1* | 8/2010 | Dinoff et al. | 455/456.3 |
| 2010/0317371 A1* | 12/2010 | Westerinen | H04M 1/72566 455/456.6 |
| 2011/0053574 A1* | 3/2011 | Rice | 455/418 |
| 2011/0057790 A1* | 3/2011 | Martin et al. | 340/539.13 |
| 2011/0061016 A1 | 3/2011 | Song et al. | |
| 2011/0185437 A1* | 7/2011 | Tran et al. | 726/28 |
| 2011/0307478 A1* | 12/2011 | Pinckney et al. | 707/724 |
| 2012/0034904 A1* | 2/2012 | LeBeau | G10L 15/265 455/414.1 |
| 2012/0084349 A1* | 4/2012 | Lee | G06Q 30/02 709/203 |
| 2012/0135716 A1 | 5/2012 | Katpelly et al. | |
| 2012/0179828 A1* | 7/2012 | Kobayashi et al. | 709/227 |
| 2012/0231816 A1* | 9/2012 | Kubo | 455/456.3 |
| 2012/0252497 A1* | 10/2012 | Altscher | 455/456.3 |
| 2013/0046623 A1* | 2/2013 | Moritz | G06Q 30/02 705/14.53 |
| 2013/0130669 A1* | 5/2013 | Xiao et al. | 455/418 |
| 2013/0132896 A1* | 5/2013 | Lee et al. | 715/808 |
| 2014/0171051 A1* | 6/2014 | Rice | 455/417 |

OTHER PUBLICATIONS

Chang, Yu-Ling. "A Dynamic User-Centric Mobile Context Model." University of Waterloo, Ontario, Canada, 2010.

Siewiorek et al. "SenSay: A Context-Aware Mobile Phone." Carnegie Mellon University, Pittsburgh, PA. Oct. 21, 2005.

* cited by examiner

SYSTEMS AND METHODS FOR AUTOMATICALLY LOGGING INTO A USER ACCOUNT

BACKGROUND

1. Field

The subject matter described herein relates generally to data processing networks and, more particularly, to systems and methods for automatically logging into a user account.

2. Related Background

Many people are users of more than one email account and/or more than one account of another type (e.g., social network, online shopping, etc.). In a single day, a typical user may access the user's personal email account a few times to handle personal communication and access the user's work email account a few times to handle communication for work. The accesses to the accounts may switch back and forth.

To further complicate the situation, a user may access different accounts using one device (e.g., a mobile device, tablet, laptop, desktop, etc.) or from any one of two or more devices. Often, it is confusing to maintain knowledge of which device is used to log on to which account, and if an account is left open (e.g., logged on) on a device that should not have been (e.g., exposing to security and/or privacy risks).

SUMMARY

The subject matter includes a device-implemented method for automatically logging into a user account, including a device-implemented method for logging into a user account, comprising receiving, using a device, data from an external source or from two or more sources comprising an internal source and another source, wherein the external source is not a user; determining, using the device, that at least a portion of received data is new data; and based on the received data, automatically logging in, from the device, to an account of the user.

The subject matter also includes a non-transitory computer readable medium having stored therein computer executable instructions for receiving, using a device, data from an external source or from two or more sources comprising an internal source and another source, wherein the external source is not a user; determining, using the device, that at least a portion of received data is new data; and based on the received data, automatically logging in, from the device, to an account of the user.

The subject matter further includes at least one computing device comprising storage and a processor configured to perform receiving, using a device, data from an external source or from two or more sources comprising an internal source and another source, wherein the external source is not a user; determining, using the device, that at least a portion of received data is new data; and based on the received data, automatically logging in, from the device, to an account of the user.

In addition to a device-implemented method as described above, the subject matter may be implemented in a system, by one or more servers, and/or as codes stored on a computer-readable medium, but are not limited thereto.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for automatically logging into a user account or service.

Figure 1:
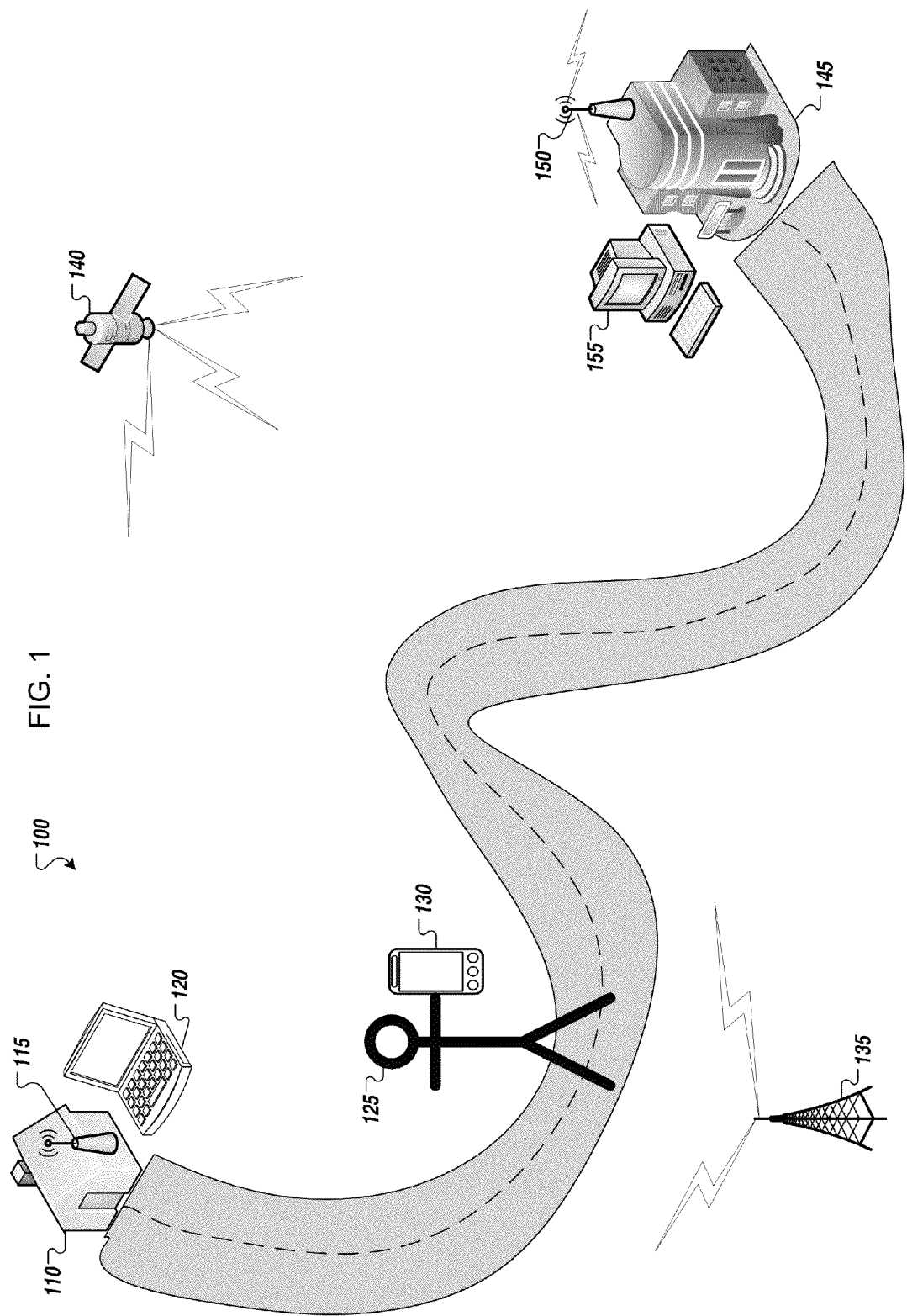
FIG. 1 shows an example of a user computing environment suitable for some implementations of the subject matter described herein.

FIG. 1 shows an example of a user computing environment suitable for some implementations of the subject matter described herein. Environment (Env) 100 includes building 110 with network access point 115 (wired and/or wireless) and device 120; a user 125 with a mobile device 130; network access point 135 (e.g., a cellular tower), satellite 140 (e.g., global positioning system (GPS) service provider and/or network access point); and another building 145 with network access point 150 (wired and/or wireless) and device 155. Env 100 shows that a user 125 may access services using devices 120, 130, and/or 155.

User 125 may access one or more personal email accounts; one or more work email accounts; one or more personal social network accounts; one or more social network accounts associated with work, profession, other organizations (e.g., not-for-profit organizations or special interest groups, etc.); and other and online services. At different times, on different dates, and/or at different locations, user 125 may access different online services, switching among many accounts in some days. Some or all of the switching of accounts may be automatically initiated or performed for the user without being initiated by the user.

For example, building 110 may be the user's 125 home with a network access point 115 that provides access to some networks for devices 120 (e.g., a laptop) and 130 (e.g., a mobile device, such as a smartphone or tablet computing device). When user 125 is at home, she (for simplicity, user 125 is referred to as "Alice") mainly accesses her personal accounts and services, such as a personal email, a person social network account, and a personal shopping account. Occasionally, Alice may access non-personal accounts (e.g., checking her work email to keep track of a project, etc.). She may use device 120 and/or 130 at home.

User 125 may travel or commute to her work. On the way to work or from work, she may access her personal accounts and non-personal accounts using device 130. At work, in building 145, she mainly accesses accounts associated with her work (e.g., work email account), using a work computer 155 and/or device 110. Occasionally, she may access her personal accounts at work (e.g., using her personal email to communicate with her babysitter, etc.) using device 155 and/ or 110. Logging into an account or connecting to an online service may be automatically initiated or performed (auto connect) for Alice when a context associated with that account or online service is detected or identified.

Alice has full control of the auto connect features. Alice may opt in to activate one or more features. Alice may define, configure, or customize the features. For example, Alice may define numerous contexts, in which a device may automatically initiate (e.g., propose or suggest) a connection to an online service on Alice's behalf. Alice may fine-tune the features by, for example, using settings to customize the features and/or by providing feedback to "teach" the device regarding the context and/or the accuracy of a detected context.

Alice may opt out of any auto connect features. In some implementations, the auto connect features may be activated ("turn on") or deactivated ("turn off") using a user's voice. For example, when a device is in a state to accept voice command, Alice may say "cancel auto connect" (e.g., before Alice enters a movie theater). Alice may turn on or enable the auto connect features by saying to the device, for example, "activate auto connect" (e.g., as she steps out of the theater).

Figure 2:
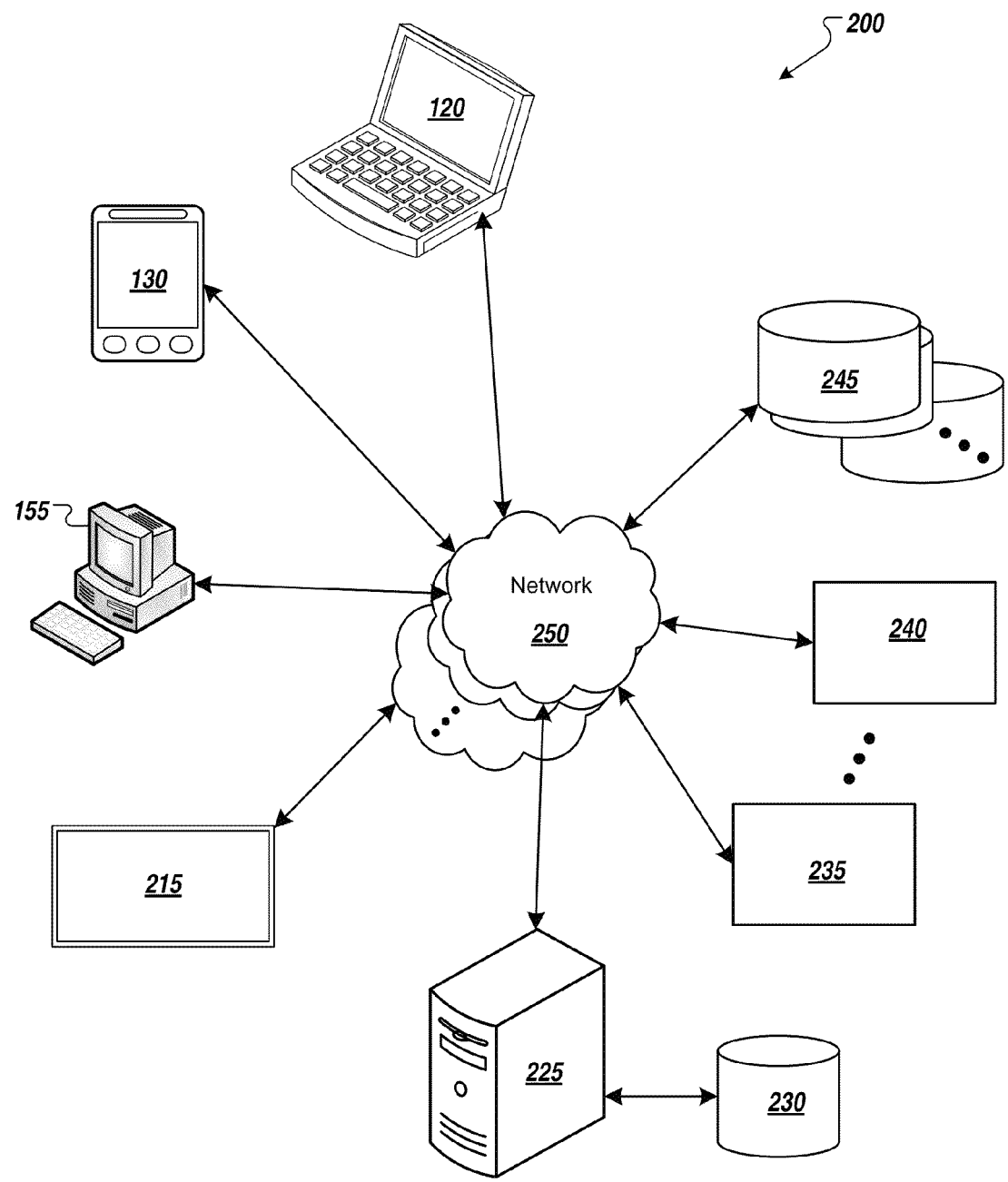
FIG. 2 shows another example of a user computing environment suitable for some implementations.

FIG. 2 shows another example of a user computing environment suitable for some implementations. Env 200 includes devices 120, 130, 155, and 215-245, and each is communicatively connected to at least one other device via, for example, one or more networks 250 (e.g., by wired and/or wireless connections). Some devices may be communicatively connected to one or more storage devices 230 and 245.

An example of one or more devices 120, 130, 155, and 215-245 may be computing device 605 described below in FIG. 6. Devices 120, 130, 155, and 215-245 may include, but are not limited to, a computer 120 (e.g., a laptop computing device), a mobile device 130 (e.g., smartphone or tablet), a television 215, a server computer 225, computing devices 235-240, storage devices 230 and 245.

In some implementations, devices 120, 130, 155, and 215 may be considered user devices (e.g., devices that may be used by user 125 and/or other users to login to accounts and/or access online services). Devices 225-245 may be devices associated with service providers (e.g., used to provide services, such as email and/or other online services, and/or store data).

For example, Alice may access her personal email before a prescribed time, e.g., 8:00 AM using device 120 and/or 130. On her way to work, Alice may access, view, and/or share content from one of her social network account and access work email using device 130. Arriving to her work place by 8:30 AM, Alice uses her work computer 155 to access her work email and use device 130 to access her personal email. In the evenings on weekdays, Alice may watch television shows using device 215 (e.g., a television with computing capabilities or hardware). In a weekday evening, if is on the first to $15^{th}$ of a month, she also logs into her work email using television 215 to monitor her email traffic (e.g., she may be responsible for email support the first half of each month).

Devices 120, 130, 155, and 215 may include mechanisms to learn Alice's online services access patterns and automatically logon, when Alice has opted-in, to the appropriate online services based on the patterns. In some example implementations, mechanisms may be provided for Alice to configure, set, or "teach" her access patterns. Alice's access patterns may be based on one or more sources of data.

Table 1 shows examples of sources that provide context data. Some sources may be referred to as external sources and some may be referred to as internal sources. A source or group of related sources of data originated external to a device is referred to as an external source. Examples of external sources include location, proximity, contact, theme, audio, camera, calendar of another user, and any other external source. Data provided or transmitted from an external source are detected or received by a device.

A source or group of related sources of data originated by a device or internal of a device is referred to as an internal source. An internal source can be hardware, software, or a combination of both, such as a module or an application executed on the device and/or a component, a clock, a storage, sensors, input interfaces, switches, etc. embedded in or attached to the device. Examples of internal sources include calendar of the user of the device, time, actions, gestures, and any other internal source.

TABLE 1

Sources of Data

| Data Source | External | Internal | Examples |
|---|---|---|---|
| Location | EXT | | Detected GPS signals, wireless signals, etc. |
| Proximity | EXT | | Detected physical closeness of persons, places, devices, etc. |
| Communication Contact | EXT | | Measured by online service interaction (e.g., frequency, frequency/period), such as email, social network, etc. |
| Theme | EXT | | Determined by content (e.g., keywords, key phases, media) of messages, posts, etc. |
| Audio | EXT | | Detected sounds, noise, voices |
| Camera | EXT | | Detected images or videos, such as indoors outdoors, night vs. daylight, city vs. country side, etc. |
| Other-ext | EXT | | Any data/information a device or a component of the device may receive or detect from an external source |
| Calendar (other) | EXT | | Entries of one or more calendars of users not using the device |
| Calendar (self) | | INT | Entries of one or more calendars of a user using the device (may be stored on a network or cloud) |
| Time | | INT | Current time, time of day, day of week, week of month, month of the year, season, routines, etc. |
| Actions | | INT | Detected user and/or device actions, e.g., power on/off or lock/unlock a feature or the device, open/close files; run/stop applications, etc. |
| Gestures | | INT | Feedback from sensors, gyroscopes, etc. that provide orientations, headings, directions, speed, pitch, elevations, motions, etc. of a device |
| Other-int | | INT | Any data/information a device or a component of the device may generate and/or provide |

Table 1, left column, shows the identifiers or labels of sources of data (an identifier may refer to two or more related source of data). The next two columns provide indications of the sources being external or internal. The "Examples" column provides examples of the sources of data. Some sources of data are further described herein (below and in the examples of use).

The location source of data refers to one or more sources of data that provide or can be used on infer location information (e.g., GPS data or signals, wireless data, such as Wi-Fi, Bluetooth, NFC, infrared signals, etc.). Examples of sources of location data include satellites, network access points, or other devices.

The proximity source of data refers to one or more sources of data may that provide or can be used on infer proximity information. For example, Alice's friends and/or co-workers may allow her to receive their location information. Devices used by her friends and/or co-workers may provide their location information directly to Alice's device (e.g., device 130) or to be accessed by Alice through a service provider (e.g., providing location information sharing). When Alice accesses that service from any device, their location information is available for access from that device.

Another example of proximity data is the information about a device or location. For example, when Alice returns home, where there is a WiFi access point (or a printer, etc.). Information about that access point or printer, such as the access point's identifier (e.g., the service set identification or SSID, media access control address, or MAC address, etc.) provides an indication that a device (e.g., device 130) that is in range to receive the identity information of the access point is in the proximity or near the access point. The stronger the signal of the access point implies the closer to the access point.

Figure 3A:
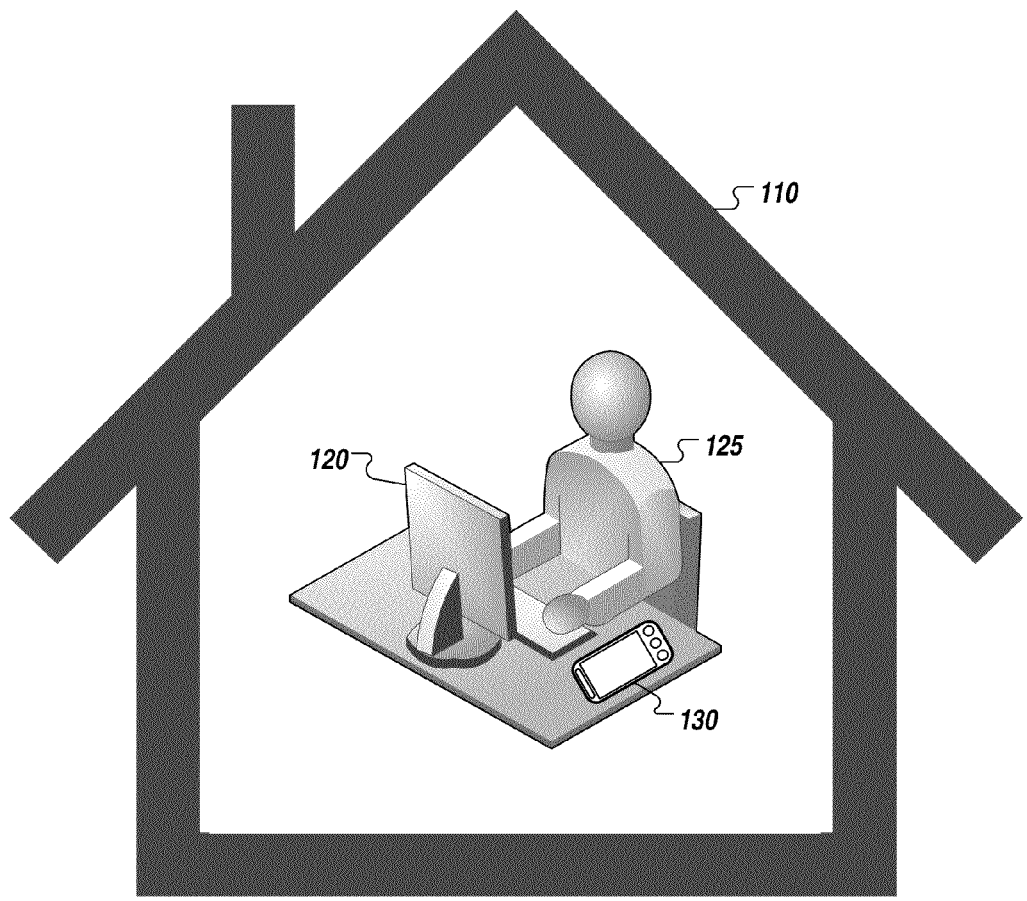
FIG. 3A shows an example portion of a user computing environment.

FIG. 3A shows an example portion of a user computing environment. User 125 (e.g., Alice) may be in building 110 or has just arrived there, which may be her home, a library, a coffee shop, or anywhere that provides her with access to device 120. Alice may use device 120 and/or 130. If a device is under Alice's control and/or has Alice's consent, the device may automatically login to Alice's online services or accounts (auto connect) based on the contextual environment or a change thereof in which the device is operated.

Auto connect features may be implemented as software modules or applications (collectively referred to as an auto connect app) executed on a device to provide the features on that device. An auto connect app on one device may communicate with another auto connect app on another device, for example, to shared information or detected contexts.

In one auto connect example, Alice may work from home 110 and log into her work email account using device 120. An auto connect app executing on device 120 may monitor a few data sources for context changes. Audio may be a source configured to be monitor. Alice may have configured the auto connect app (e.g., through settings) to "teach" the auto connect app that detecting the voices of her children constitute a context change. When the auto connect app detects, using the microphone of device 120, voices of Alice's children (e.g., who have returned home from school), the auto connect app, based on Alice's configuration, automatically logs into Alice's home email account. In some situations, the auto connect application provides a user interface with a few options for Alice to choose, or otherwise provide input.

Figure 3B:
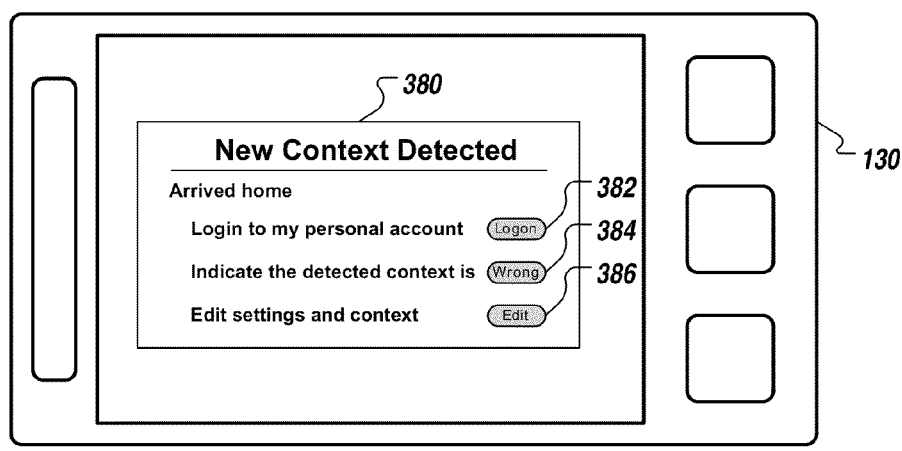
FIG. 3B shows an example user interface.

FIG. 3B shows an example user interface (UI). UI 380 is provided after a new context is detected, such as the examples described above and below. For example, based on location data (e.g., GPS signals) or proximity data (e.g., detecting a home SSID or printer, etc.), the auto connect app on device 130 detects that Alice has arrived home. The auto connect app provides UI 380 with three input options 382-386, as shown. In actual implementation, there can be any number of options.

Option 382 allows Alice to confirm, agree, or accept a proposal or suggestion of an online service (e.g., login to Alice's personal account due the detecting a new context being Alice's home). In some implementations, option 382 may ask for Alice's login credentials. If the detected context and/or the proposed option is incorrect or not what Alice wants, Alice may choose option 384 to provide feedback that indicates the proposed context or connection is incorrect or to be changed (e.g., do not provide the same proposal under the same context from now on). Based on Alice's feedback, the auto connect app may look for another account or service to propose or provide a serious of questions to Alice to learn what to propose if the same context change is detected in the future, or, to learn that the context change needs additional or different data.

Another option 384 allows Alice to edit different settings and/or the detected context to, for example, fine tuning the auto connect features. For example, Alice may be satisfied that every time so far, the auto connect app has correctly detected the "arrived home" context and correctly proposed logging into Alice's personal account (e.g., personal email account). Instead of selecting option 382 to accept the proposal this time, Alice wants to indicate that, from now on, go ahead and make the connection automatically without being asked or prompted. Alice decides to use the edit option 386 to, for example, set a flag that tells the auto connect app to automatically login to my personal account when arrived home is detected.

After the flag is set, the auto connect app will, without presenting UI 380, automatically login to Alice's personal account when detecting that she has arrived home. Alice may clear the flag or change any settings at any time by, for example, activating a console or setting screen (not shown) of the auto connect app. Alice may also turn on or off the auto connect app by, for example, voice commands as describe above and/or other UI (not shown).

Returning to FIG. 3A, where other examples of context changes are represented. For example, device 120 may also detect an arrived home context based on, for example proximity data (e.g., detecting device 130 is nearby). Instead of proposing to login to Alice's person email account as shown on device 130, device 120 may proposed to connect to Alice's shopping account based on historic data or Alice's settings on device 130, which indicate to the like of an auto connect app that Alice logs into her shopping account when she is home. Depending on Alice's setting, the like of UI 380 may or may not be provided on device 120 to ask Alice to accept the proposal.

Alice may define other contexts, such as whenever a camera on her mobile device 130 detects one of the paintings on the walls of home 110, or made two such detections within a time window, then propose or initiate to switch to Alice's home email account. Alice may define a context that looks for the current time being after 7:00 PM, Monday to Friday, and all day Saturday and Sunday, detects that Alice is not at work (e.g., based on location and/or proximity data), then log off her work email account if logged on and automatically, without confirmation, logs into another email account. Alice provides the credentials needed to login to that account. Another context Alice may define is based on time (e.g., 7:00 PM, Monday to Friday, and all day Saturday and Sunday) and one or more actions (e.g., Alice exits or closes a program or application associated with work, such as an account payable application).

Figure 4:
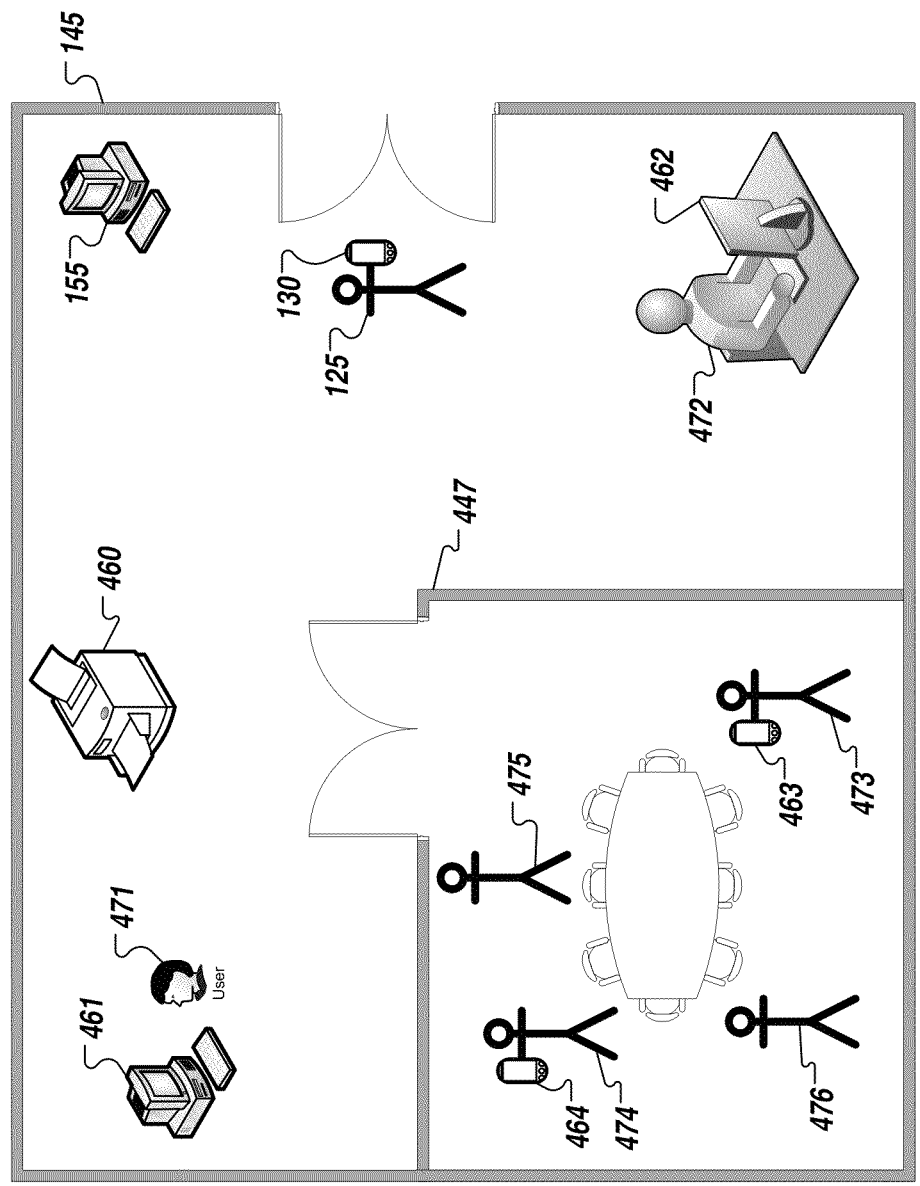
FIG. 4 shows another example portion of a user computing environment.

FIG. 4 shows another example portion of a user computing environment. Building 145 may be a work location with a meeting room 447. There may be devices 460-464 and users 471-476 in addition to user 120 (e.g., Alice) with her mobile device 130. Alice's device 130 may automatically log into her work network resources based on GPS signals that indicate Alice is in or near building 145 or based on detecting the SSID of a network access point at location 145. Device 130 may automatically login to her work account based on proximity data showing one or more of her co-workers 471-476 are in the vicinity.

As user 125 (Alice) enters meeting room 447, Alice's music streaming or playing on device 130 may automatically mute or turned off based on detecting that Alice is in meeting room 447 and/or based on proximity data showing four users 473-476 are in the room. As soon as Alice walks in building office 145 (e.g., based on location and/or proximity data shared from device 130), Alice's work computer 155 may automatically log into resources needed for the day based on calendar entries.

The contexts described herein are mere examples and not limited to those described. A context may be based on one or more source of data. Table 1 above shows a few data source examples. Once a context is detected a device (e.g., executing an associated plugin, module, application, program, etc.) may propose or suggest an action for a user (e.g., login to or logoff from an account, connect to or disconnect from a service, start or stop a program, service, etc.). The proposed or suggested action may be taken automatically for the user (e.g., if the user so indicated in a setting). If taking the proposed or suggested action necessitates additional actions, the additional actions are also performed. For example, if logging in an account from one device requires logging of the account from another device, a proposed login to that account, if accepted by the user, may lead to sending an account logoff request (e.g., to a service provider of that account or to another device that has logged into that account).

Additionally, for example but not by way of limitation, a filtering approach may be employed, in which associated account content is blended. Based on the above-described context switch (e.g., potential input signals shown in Table 1 above), the example implementation automatically opens a related account and/or content (e.g., online content stored in email, a cloud computing environment, a social networking environment, or the like). For example, but not by way of limitation, when arriving in a meeting room, a browser may open the right account identities, and focus on relevant content for the meeting. The filtering may be applied not just in a single account, but with multiple open accounts that are associated. For example, when searching for "birthday", results may show both work and private related email content.

Figure 5:
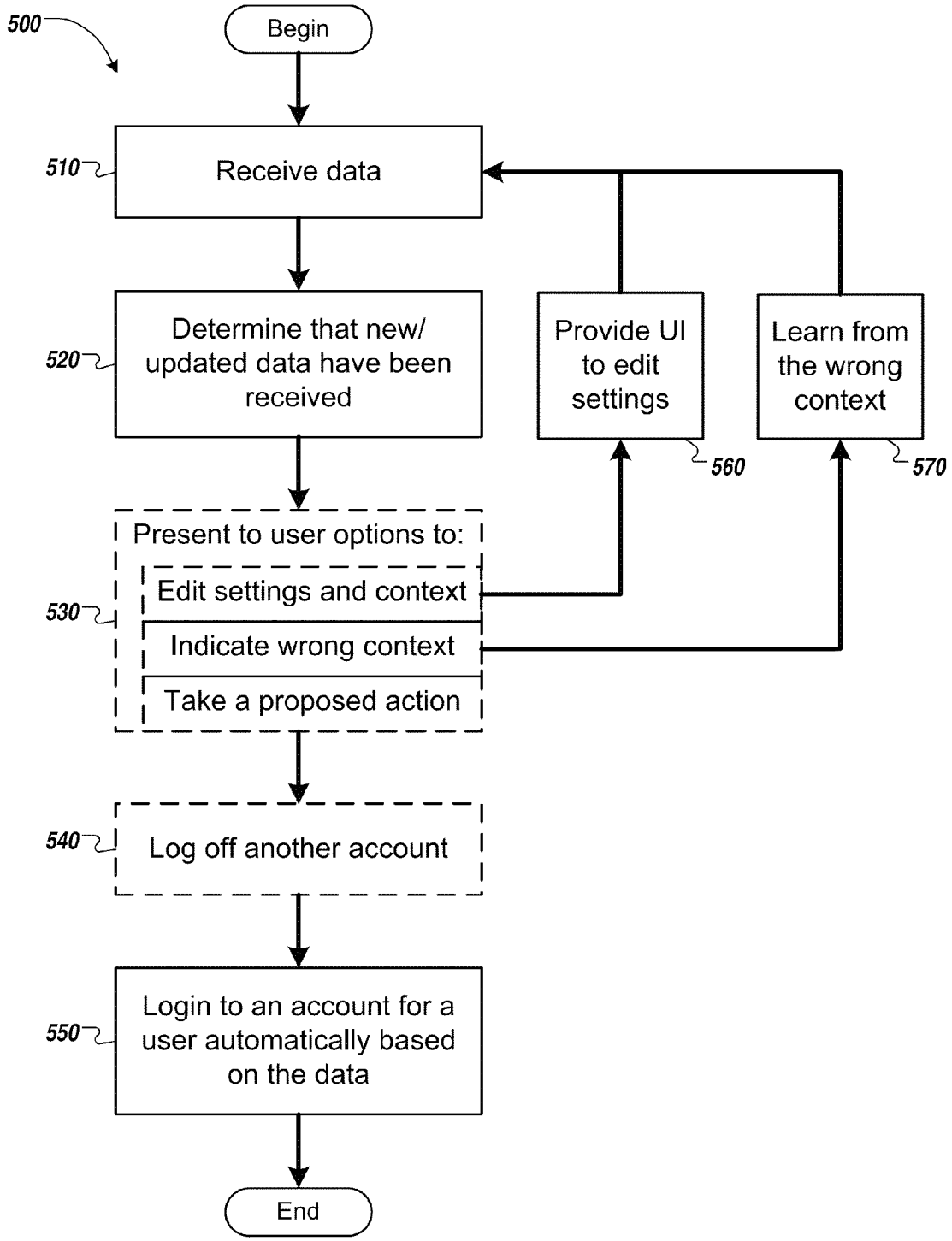
FIG. 5 shows an example process according to some implementations.

FIG. 5 shows an example process according to some implementations. Process 500 starts with receiving data at block 510. The received data may be any data or information that provide a context in which a device is operated. The context can be derived from one or more sources of information. At block 520, the received data is processed to determine if there is updated information. For example, GPS signals have been the same, which indicated a certain location. The GPS signals last received contain coordinates different from previous GPS signals. Processing or comparing the last-received GPS signals with those received in previous time (e.g., the time just prior to the last reception) will show that there are new or updated GPS coordinates.

If the received data and the updated data represent a new context (e.g., a change of context), at block 550, automatically connect to a service (e.g., login to an account, such as email account) for a user.

In some implementations, before block 550, one or more options may be presented to the user at block 530. For example, the options may include accepting or agreeing with a proposed action, indicating that a proposed action and/or the underlying context are wrong, and edit auto connect settings. Different or other options may be provided depending on implementations. When the user indicates that he or she is accepting or agreeing with a proposed action, which may be logging into an account, process 500 may flow to an optional block 540 another account may be logged of or the same account may be logged off from another device.

If the user chooses the option for indicating that a proposed action and/or the underlying context are wrong, process 500 learn from the wrong action and/or context at block 570. Learning from a wrong proposal, in some implementations, simply means do not provide the same proposal based on the same context. In other implementations, learning may involve fine tuning a proposal. For example, one or more questions may be asked of the user to learn of a deviation of the context (e.g., at 7:30 PM instead of 7:00 PM) or a change to the proposed action (e.g., to login to another one of the user's personal email account instead of the one in the proposed action).

If the user chooses to edit the auto connect settings, process 500 provides mechanism or UI for doing so at 560.

In some examples, process 500 may be implemented with different, fewer, or more blocks. Process 500 may be implemented as computer executable instructions, which can be stored on a medium, loaded onto one or more processors of one or more computing devices, and executed as a computer-implemented method.

Figure 6:
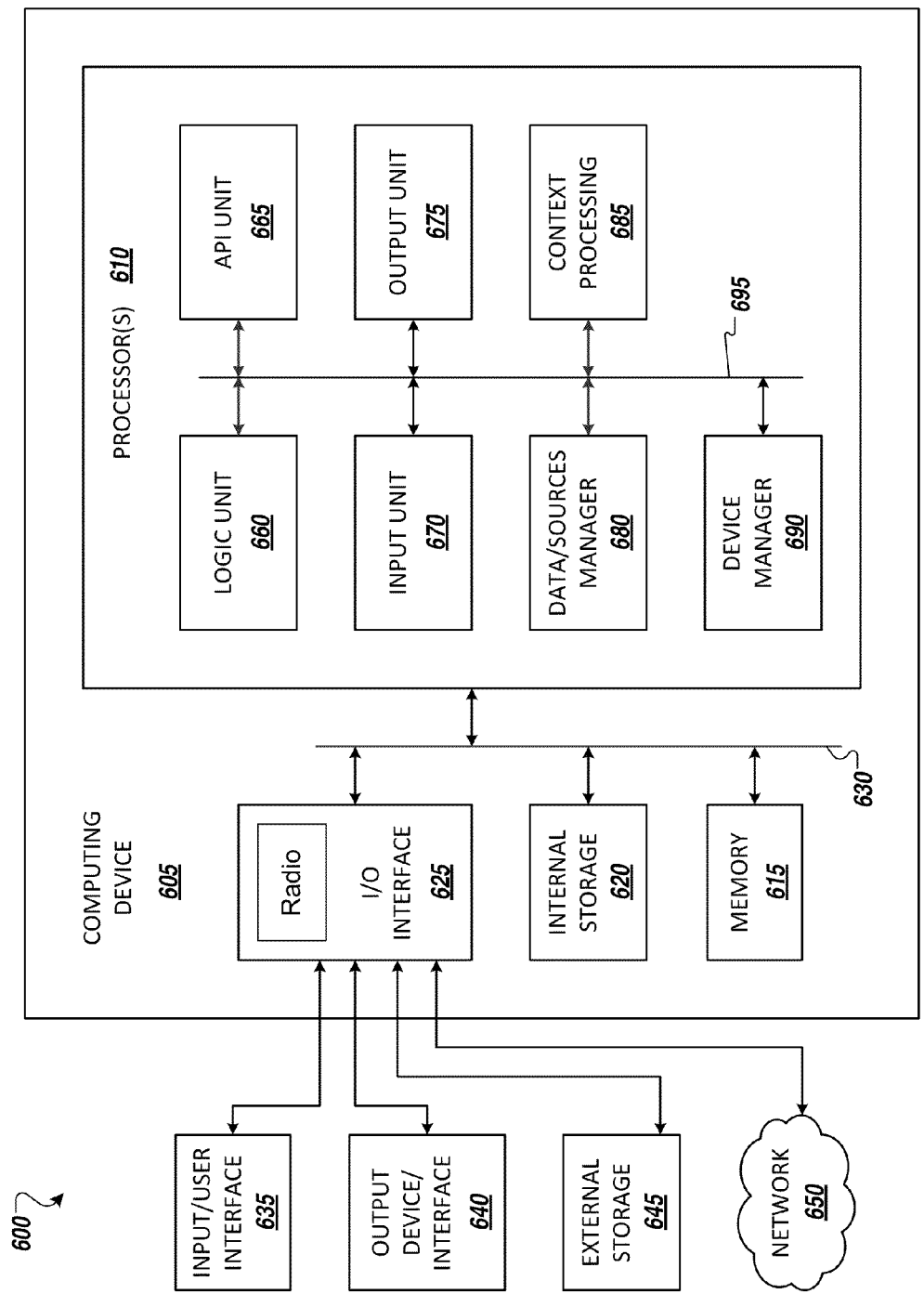
FIG. 6 shows an example computing environment with an example computing device suitable for use in some example implementations.

FIG. 6 shows an example computing environment with an example computing device suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computing device 605. In other example implementations, other computing devices may function as or provide the functions of input/user interface 635 and output device/interface 640 for a computing device 605.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

/O interface 625 can include, but is not limited to, wired and/or wireless (e.g., radio, infrared, etc.) interfaces using any communication or I/O protocols or standards (e.g., Ethernet, 802.11x, Universal System Bus, WiMax, modem, a cellular network protocol, near field communication (NFC), Bluetooth, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, data/sources manager 680, context processing 685, device manager 690, and inter-unit communication mechanism 695 for the different units to communicate with each other, with the OS, and with other applications (not shown). For example, data/sources manager 680, context processing 685, and device manager 690 may implement one or more processes shown or described in FIGS. 1-5. The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675, data/sources manager 680, context processing 685, and device manager 690). For example, when input unit 670 receives data from one or more sources, the data are passed to data/sources manager 680, which filters the data based on user settings or configuration of the auto connect features. Context processing unit 685 processes the data to determine if the data show a context or a change of context. If it is determined that a context exists for an auto login or connect action, device manager 690 performs the auto action. The auto action may be preceded by seeking the user's acceptance (e.g., providing a UI with options as shown in FIG. 3B). If the user has indicated that an auto action based on the detected context is to be performed automatically, the device takes the auto action without seeking input from the user.

In some instances, logic unit 660 may be configured to control the information flow among the units and direct the services provided by API unit 665, input unit 670, output unit 675, data/sources manager 680, context processing 685, and device manager 690 in some example implementations described above. For example, the flow of one or more processes or implementations may be controlled by logic unit 660 alone or in conjunction with API unit 665.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A device-implemented method for automatically logging into a user account, comprising:
    receiving, using a device, data from an external source that comprises data originated external to the device or from two or more sources comprising an internal source that comprises data originated internal to the device and another source, wherein the external source is not a user;
    determining, using the device and without the user providing an instruction, that a new context associated with a physical computing environment of the user exists, based on at least a portion of received data being new data;
    providing a user interface to select at least one recommendation that associates the determined new context with the automatically logging into the user account;
    adapting the at least one recommendation based on a learned online services access pattern associated with historical access to online services by the user at the physical computing environment of the user; and based on a response to the at least one recommendation received via the user interface, automatically logging in, from the device, to the user account without being initiated by the user; and providing the user with an option to edit settings and the detected context to fine tune the automatically logging into the account, the providing comprising:

providing the user with an option to indicate that the automatic logging into the account should be performed and to discontinue the prompting of the user;

setting a flag that provides an indication to perform the automatically logging into the account when the context is detected; and without providing the user with a user interface, performing the automatically logging into the account when the context is detected, based on the value of the flag; and receiving information from the user that an indication of presence of another user physically located at a physical information environment of the user is the new context so as to perform the determining, and performing the providing the at least one recommendation based on the detection of the presence.

2. The method of claim 1, wherein the user interface further includes an input control configured for the user to provide feedback information to the device.

3. The method of claim 1, further comprising automatically logging off another account of a user from the device.

4. The method of claim 1, further comprising sending a request to log off the account from another device that is associated with the computing environment of the user.

5. The method of claim 1, wherein the account is an online account associated with at least an email service.

6. The method of claim 1, wherein the data are from the two or more sources, the data includes time information from the internal source and action information from the another source, and the time information is the new data that represents a time associated with the account, and wherein the automatically logging into the account is further based on the action information.

7. The method of claim 1, wherein the automatically logging into the account is further based on a setting indicating allowing automatically logging in.

8. The device-implemented method of claim 1, further comprising providing one or more questions to the user associated with the online services access patterns to generate a teaching by the user so that the device learns to provide the at least one recommendation if the new context is detected in the future, or learns that the new context requires additional or different data based on the teaching by the user being associated with answers to the series of questions.

9. The device-implemented method of claim 1, wherein when the at least one recommendation is determined by the user to not be correct, the device learns to not provide the at least one recommendation in the future.

10. The device-implemented method of claim 1, wherein the at least one recommendation is fine-tuned by providing one or more questions to the user associated with a deviation in a context or a change in a proposed action, and teaching the device the context and accuracy of a detected context based on answers to the one or more questions.

11. The device-implemented method of claim 1, wherein the indication of presence comprises information from the user that a detection of audible sound of a voice of the another user physically located at the physical information environment of the user is the new context.

12. A non-transitory computer readable medium having stored therein computer executable instructions for:

receiving, using a device, data from an external source that comprises data originated external to the device or from two or more sources comprising an internal source that comprises data originated internal to the device and another source, wherein the external source is not a user;

determining, using the device and without the user providing an instruction, that a new context associated with a physical computing environment of the user exists, based on at least a portion of received data being new data;

providing a user interface to select at least one recommendation that associates the determined new context with the automatically logging into the user account;

adapting the at least one recommendation based on a learned online services access pattern associated with historical access to online services by the user at the physical computing environment of the user; and based on a response to the at least one recommendation received via the user interface, automatically logging in, from the device, to the user account without being initiated by the user; and providing the user with an option to edit settings and the detected context to fine tune the automatically logging into the account, the providing comprising:

providing the user with an option to indicate that the automatic logging into the account should be performed and to discontinue the prompting of the user;

setting a flag that provides an indication to perform the automatically logging into the account when the context is detected; and without providing the user with a user interface, performing the automatically logging into the account when the context is detected, based on the value of the flag; and receiving information from the user that an indication of presence of another user physically located at a physical information environment of the user is the new context so as to perform the determining, and performing the providing the at least one recommendation based on the detection of the presence.

13. The computer readable medium of claim 12, wherein the data are from the external source, the data comprise proximity data and the new data that represents a degree of physical closeness between the device associated with the account and another device in the computing environment of the user.

14. The computer readable medium of claim 12, wherein the data are from the two or more sources, the data includes gesture information from the internal source and calendar information from the another source, and the gesture information is the new data that represents a gesture associated with the account, and wherein the automatically logging into the account is further based on the calendar information.

15. At least one computing device comprising storage and a processor configured to perform:

receiving, using a device, data from an external source that comprises data originated external to the device or from two or more sources comprising an internal source that comprises data originated internal to the device and another source, wherein the external source is not a user;

determining, using the device and without the user providing an instruction, that a new context associated with a physical computing environment of the user exists, based on at least a portion of received data being new data;

providing a user interface to select at least one recommendation that associates the determined new context with the automatically logging into the user account;

adapting the at least one recommendation based on a learned online services access pattern associated with historical access to online services by the user at the physical computing environment of the user; and based on a response to the at least one recommendation received via the user interface, automatically logging in, from the device, to the user account without being initiated by the user; and providing the user with an option to edit settings and the detected context to fine tune the automatically logging into the account, the providing comprising:

providing the user with an option to indicate that the automatic logging into the account should be performed and to discontinue the prompting of the user;

setting a flag that provides an indication to perform the automatically logging into the account when the context is detected; and without providing the user with a user interface, performing the automatically logging into the account when the context is detected, based on the value of the flag; and receiving information from the user that an indication of presence of another user physically located at a physical information environment of the user is the new context so as to perform the determining, and performing the providing the at least one recommendation based on the detection of the presence.

16. The at least one computing device of claim 15, wherein the account is an online account associated with a plurality of services comprise an email service.

17. The at least one computing device of claim 15, wherein the data are from the external source, the data comprise at least one of audio and camera data, and the new data that represents at least one of a sound, image and video associated with the account.

\* \* \* \* \*